United States Patent
Ikemura et al.

(10) Patent No.: US 12,017,638 B2
(45) Date of Patent: Jun. 25, 2024

(54) CONTROL DEVICE FOR VEHICLE

(71) Applicant: TOYOTA JIDOSHA KABUSHIKI KAISHA, Toyota (JP)

(72) Inventors: Masashi Ikemura, Toyota (JP); Yukihiko Ideshio, Nisshin (JP); Tetsuya Yamaguchi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 17/585,157

(22) Filed: Jan. 26, 2022

(65) Prior Publication Data

US 2022/0242397 A1    Aug. 4, 2022

(30) Foreign Application Priority Data

Feb. 2, 2021 (JP) ................................ 2021-014989

(51) Int. Cl.
    *B60W 20/30* (2016.01)
    *B60W 20/20* (2016.01)
    *B60W 30/18* (2012.01)

(52) U.S. Cl.
    CPC .......... *B60W 20/30* (2013.01); *B60W 20/20* (2013.01); *B60W 30/18109* (2013.01); *B60W 2510/083* (2013.01)

(58) Field of Classification Search
    CPC ................ B60W 20/30; B60W 20/20; B60W 30/18109; B60W 2510/083
    See application file for complete search history.

(56) References Cited

U.S. PATENT DOCUMENTS 5,923,093 A * 7/1999 Tabata ................. B60L 3/0061
                                                    903/910
2008/0220933 A1    9/2008 Maeda
2014/0330494 A1   11/2014 Endo et al.

FOREIGN PATENT DOCUMENTS

| JP | 2008-221879 A | 9/2008 |
|---|---|---|
| JP | 2010-83427 A | 4/2010 |
| JP | 2010-252584 A | 11/2010 |
| JP | 2014-108752 A | 6/2014 |
| JP | 2019-158104 A | 9/2019 |
| WO | 2013/073342 A1 | 5/2013 |
| WO | 2014/087210 A1 | 6/2014 |
| WO | 2019/176548 A1 | 9/2019 |

* cited by examiner

*Primary Examiner* — Michael D Lang
(74) *Attorney, Agent, or Firm* — Oliff PLC (57) ABSTRACT

A vehicle includes: a motor generator as a drive source; an automatic transmission via which the motor generator is connected to driving wheels, the automatic transmission being configured to change a gear ratio; and a shift actuator for a driver to operate the gear ratio of the automatic transmission. A control device for the vehicle includes: a motor controlling portion configured to control output torque of the motor generator; and a gear shift controlling portion configured to control the gear ratio of the automatic transmission. In a case where the output torque has a negative value, when downshift is not requested by an operation on the shift actuator, the gear shift controlling portion prohibits a downshift process of downshifting the gear ratio of the automatic transmission, but when downshift is requested by an operation on the shift actuator, the gear shift controlling portion permits execution of the downshift process.

4 Claims, 3 Drawing Sheets

FIG. 1

CONTROL DEVICE FOR VEHICLE

CROSS-REFERENCE TO RELATED APPLICATION

This application claims priority to Japanese Patent Application No. 2021-014989 filed on Feb. 2, 2021, incorporated herein by reference in its entirety.

BACKGROUND

1. Technical Field

The present disclosure relates to a control device for a vehicle.

2. Description of Related Art

Japanese Unexamined Patent Application Publication No. 2010-252584 (JP 2010-252584 A) describes a vehicle including an internal combustion engine and an automatic transmission. Further, J P 2010-252584 A describes a technology to manufacture a so-called electric vehicle by replacing the internal combustion engine of the vehicle with a motor generator as a drive source.

SUMMARY

As a control for an electric vehicle, there has been known such a control that the gear ratio of an automatic transmission is automatically downshifted at the time when the vehicle is decelerated. Further, there has been also known such a control that a so-called gear shift shock, i.e., fluctuations in the acceleration of a vehicle along with a downshift of the gear ratio, is restrained by controlling the torque of a motor generator in accordance with a control of downshifting the gear ratio.

In the meantime, in the electric vehicle manufactured by the technology described in JP 2010-252584 A, as a newly attached motor generator, various motor generators having different performance, e.g., motor generators of different types, motor generators of different degrees of aged deterioration, and so on, are assumed. Even in a case where how to control the torque of a motor generator is to be set in advance so as to restrain a gear shift shock, it is difficult to determine an appropriate control method in advance until the performance of a motor generator to be mounted is determined. Accordingly, in a case of an electric vehicle manufactured by replacing its internal combustion engine with a motor generator or by replacing its motor generator with a new one, it is difficult to restrain a gear shift shock by use of the torque of the motor generator.

A control device for a vehicle to solve the problem is a control device for controlling a vehicle including a motor generator as a drive source for the vehicle, an automatic transmission via which the motor generator is connected to driving wheels, the automatic transmission being configured to change a gear ratio, and a shift actuator for a driver to operate the gear ratio of the automatic transmission. The control device includes a motor controlling portion and a gear shift controlling portion. The motor controlling portion is configured to control output torque of the motor generator. The gear shift controlling portion is configured to control the gear ratio of the automatic transmission. In a case where the output torque is zero or a negative value, when downshift is not requested by an operation on the shift actuator, the gear shift controlling portion prohibits a downshift process of downshifting the gear ratio of the automatic transmission, but when downshift is requested by an operation on the shift actuator, the gear shift controlling portion permits execution of the downshift process.

In the above configuration, in a case where the output torque of the motor generator is zero or a negative value, that is, in a case where the motor generator does not give a positive acceleration to the vehicle, the gear ratio of the automatic transmission is not downshifted unless the driver requests downshift by use of the shift actuator. Accordingly, in this case, a gear shift shock along with downshift does not occur. In the meantime, when the driver requests downshift by use of the shift actuator, the gear ratio of the automatic transmission is downshifted, so that a gear shift shock along with the downshift can occur. However, the gear shift shock occurs in response to the downshift requested by the driver, so that the driver is unlikely to have an uncomfortable feeling as an unexpected gear shift shock.

In the above configuration, the vehicle may include mechanical braking devices configured to brake the driving wheels, and a brake pedal for the driver to operate the braking devices. The control device may include a brake controlling portion configured to control braking force of the braking devices based on an operation amount of the brake pedal. The motor controlling portion may control the output torque regardless of the operation amount of the brake pedal.

In the above configuration, the operation amount of the brake pedal does not affect regenerative torque of the motor generator, that is, a negative acceleration given to the vehicle by the motor generator. Accordingly, such a situation does not occur that, even though the operation amount of the brake pedal is uniform, a negative acceleration caused in the vehicle varies due to variations in performance of a motor generator to be attached to the vehicle.

In the above configuration, until the downshift process is completed after the downshift process is executed, the motor controlling portion may execute a torque relaxation process of decreasing an absolute value of the output torque in comparison with an absolute value of the output torque before the execution of the downshift process.

In the above configuration, the transfer efficiency of torque via the automatic transmission changes during execution of the downshift process. On this account, when the absolute value of the output torque is large during the execution of the downshift process, the fluctuation range of force to be transmitted from the motor generator to the driving wheels easily increases due to changes in the transfer efficiency of torque. In the above configuration, the absolute value of the output torque of the motor generator during the execution of the downshift process decreases. Accordingly, even when the transfer efficiency of torque via the automatic transmission changes during the execution of the downshift process, it is possible to restrain the fluctuation range of force to be transmitted from the motor generator to the driving wheels from excessively increasing.

In the above configuration, under a condition that the absolute value of the output torque is equal to or less than a predetermined threshold, the motor controlling portion may permit the execution of the downshift process and control the output torque in the torque relaxation process such that the output torque is zero.

In the above configuration, even when the torque relaxation process is executed, the fluctuation range of the output torque does not exceed the threshold. Accordingly, the acceleration of the vehicle does not change or the vehicle does not vibrate due to the fluctuation range of the output torque being excessively large.

In the above configuration, after the downshift process is completed, the motor controlling portion may execute a torque recovery process of controlling the output torque such that the output torque has a value having the same sign as the output torque just before the execution of the downshift process and having an absolute value smaller than an absolute value of the output torque just before the execution of the downshift process.

In the above configuration, when the downshift process is completed, the gear ratio of the automatic transmission changes, so that the rotation speed of the motor generator easily increases. On this account, when the output torque is the same before and after the downshift process, the force to be transmitted from the motor generator to the driving wheels via the automatic transmission also fluctuates due to the increase in the rotational speed of the motor generator. Accordingly, a gear shift shock easily occurs at the time of completion of the downshift process. In the above configuration, after the downshift process, the output torque is smaller than that before the downshift. Accordingly, even when the rotation speed of the motor generator increases, it is possible to restrain the force to be transmitted from the motor generator to the driving wheels from fluctuating. Accordingly, a gear shift shock can be restrained at the time of completion of the downshift process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Schematic Configuration of Vehicle

Figure 1:
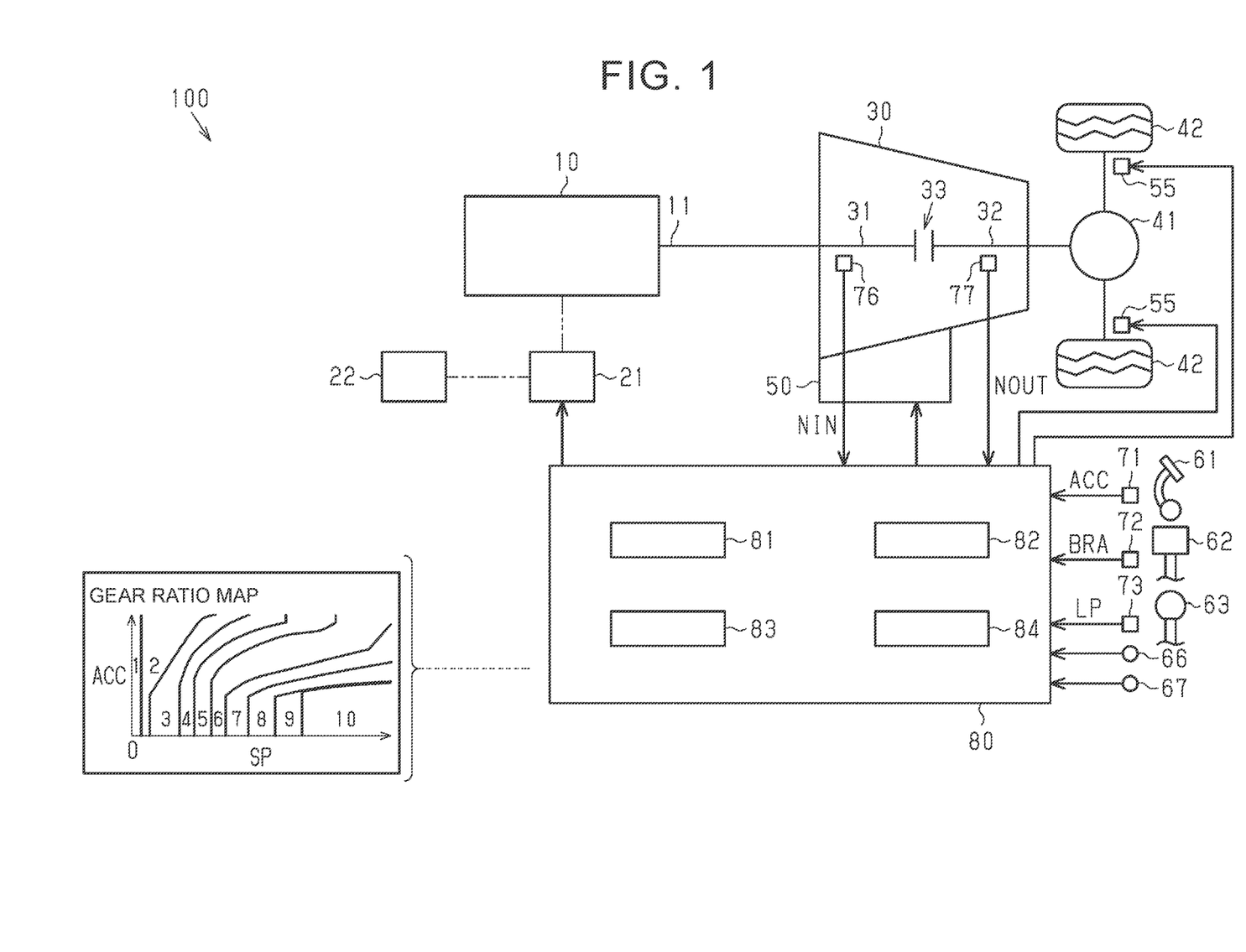
FIG. 1 is a schematic configuration diagram of a vehicle.
Figure 2:
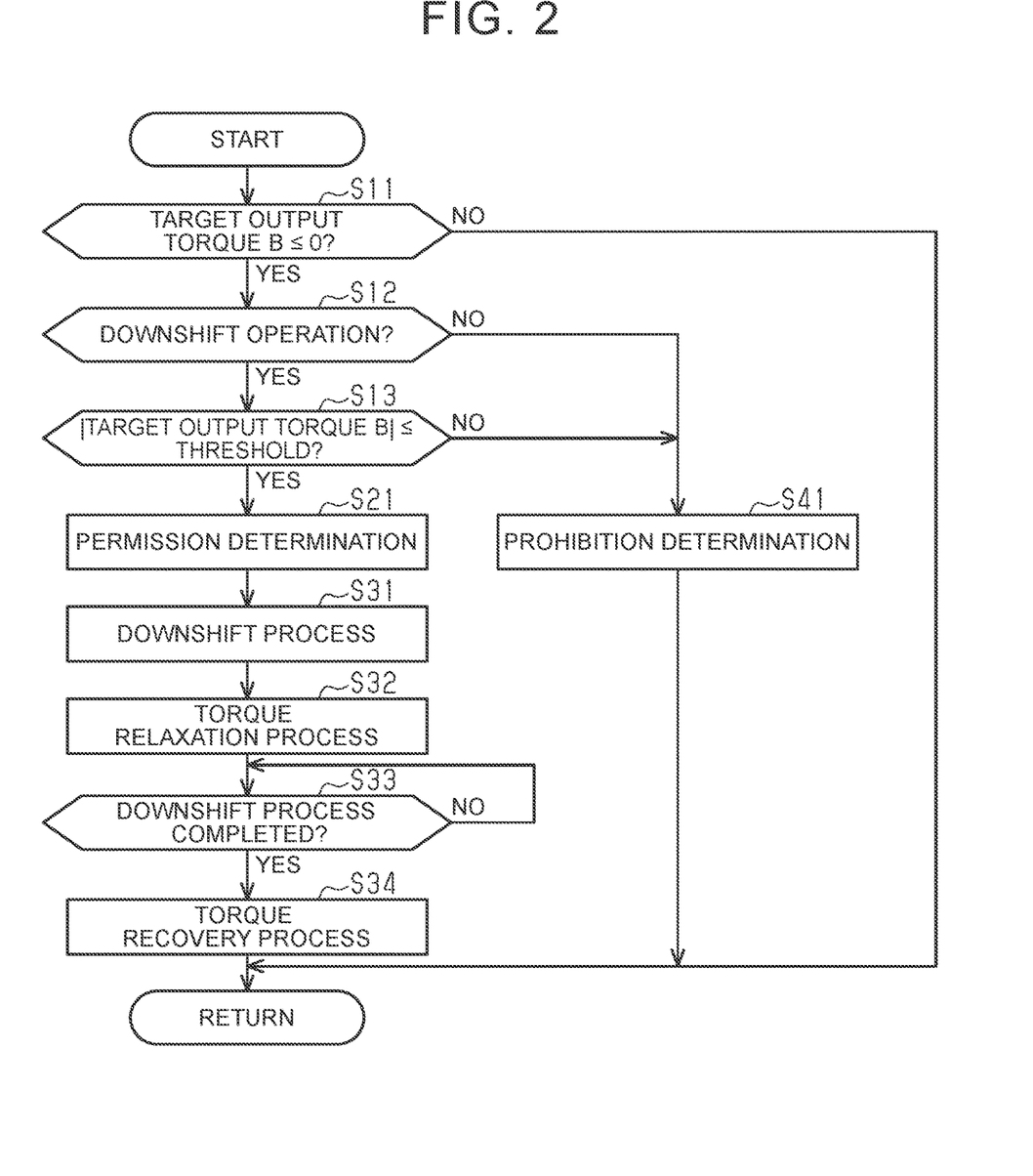
FIG. 2 is a flowchart illustrating a downshift control.
Figure 3:
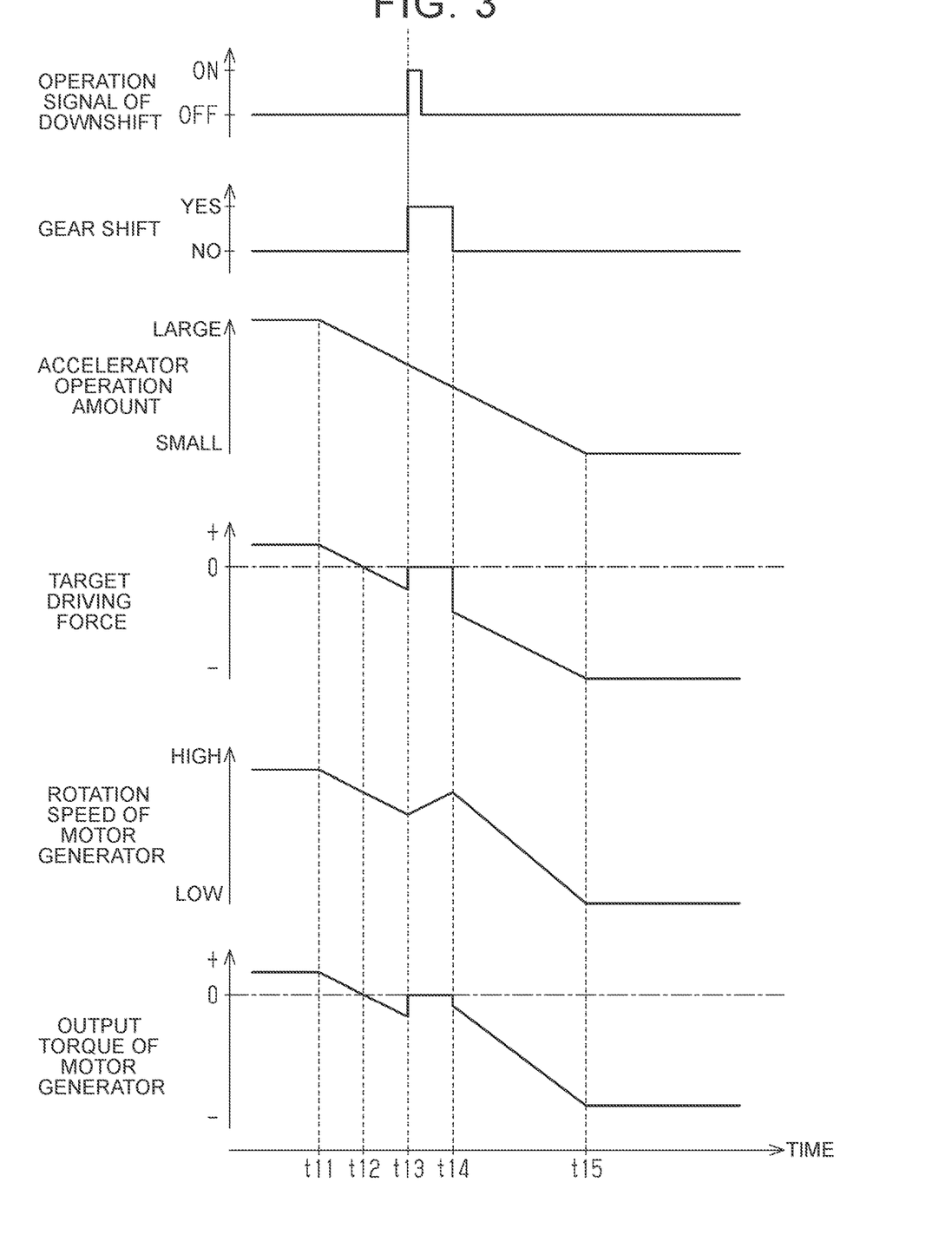
FIG. 3 is a time chart illustrating changes in an operation signal of downshift, changes between whether the gear stage of an automatic transmission is changed or not, changes in the acceleration operation amount, changes in a target driving force for the vehicle, changes in the rotation speed of a motor generator, and changes in the output torque of the motor generator.

The following describes an embodiment with reference to FIGS. 1 to 3. First described is a schematic configuration of a vehicle 100. Note that the vehicle 100 is an electric vehicle obtained by diverting a vehicle including an internal combustion engine.

As illustrated in FIG. 1, the vehicle 100 includes a motor generator 10, an automatic transmission 30, a differential 41, and a plurality of driving wheels 42. The motor generator 10 includes an output shaft 11. The output shaft 11 is connected to the automatic transmission 30. Note that the motor generator 10 functions as a drive source for the vehicle 100.

The automatic transmission 30 is a stepped automatic transmission including a plurality of planetary gear mechanisms. The automatic transmission 30 includes one input shaft 31, one output shaft 32 and a plurality of clutches 33. Note that only one clutch from among the clutches 33 is illustrated in FIG. 1.

A first end of the input shaft 31 is connected to the output shaft 11. A second end of the input shaft 31 is connected to a first end of the output shaft 32 via the clutch 33. A second end of the output shaft 32 is connected to right and left driving wheels 42 of the vehicle 100 via a differential 41. The clutch 33 is changeable between an engaged state and a disengaged state by hydraulic pressure supplied to the clutch 33. More specifically, when the hydraulic pressure to be supplied to the clutch 33 increases, the clutch 33 is switched from the disengaged state to the engaged state. A maximum torque transmittable via the clutch 33 increases as the hydraulic pressure to be supplied to the clutch 33 increases. When the hydraulic pressure to be supplied to the clutch 33 exceeds a given pressure, an input side and an output side of the clutch 33 rotate integrally. When a clutch to be brought into the disengaged state and a clutch to be brought into the engaged state are changed among the clutches 33, the gear stage of the automatic transmission 30 is changed. When the gear stage of the automatic transmission 30 is changed, the gear ratio of the automatic transmission 30 is changed.

The vehicle 100 includes an inverter 21, a battery 22, a hydraulic mechanism 50, and a plurality of braking devices 55.

The inverter 21 performs power conversion from direct current power to alternating current power and vice versa between the motor generator 10 and the battery 22. Further, the inverter 21 adjust output torque from the motor generator 10 by adjusting a transfer amount of electric power between the motor generator 10 and the battery 22. More specifically, in a case where the motor generator 10 functions as an electric machine, positive output torque is given to the driving wheels 42 from the motor generator 10 via the automatic transmission 30 and the differential 41. In the meantime, in a case where the motor generator 10 functions as a generator, negative output torque is given to the driving wheels 42 from the motor generator 10 via the automatic transmission 30 and the differential 41. Accordingly, when the motor generator 10 functions as the generator at the time of decelerating the vehicle 100, a regenerative braking force corresponding to the power generation amount of the motor generator 10 can be given to the vehicle 100.

Each of the braking devices 55 is placed to the vicinity of its corresponding driving wheel 42. The braking device 55 is a so-called mechanical braking device configured to mechanically brake the driving wheel 42. One example of the braking device 55 is a disc brake.

The hydraulic mechanism 50 is configured to supply hydraulic pressure to the automatic transmission 30. The hydraulic mechanism 50 operates the engaged state and the disengaged state of each of the clutches 33 by controlling hydraulic fluid to be supplied to the each of the clutches 33.

The vehicle 100 includes an accelerator pedal 61, a brake pedal 62, a shift lever 63, an upshift switch 66, and a downshift switch 67. The accelerator pedal 61 is a pedal for a driver to operate the acceleration of the vehicle 100. The brake pedal 62 is a pedal for the driver to operate the braking devices 55.

The shift lever 63 is a lever for the driver to change traveling states of the vehicle 100. The driver performs a changeover operation on the shift lever 63. Here, the traveling states to be changed by the shift lever 63 include parking, neutral, drive, and reverse. In a case where the traveling state of the vehicle 100 is parking or neutral, gear stage formation for non-traveling is performed in the automatic transmission 30. In a case where the traveling state of the vehicle 100 is drive or reverse, gear stage formation for traveling is performed in the automatic transmission 30.

Particularly, in a case where the traveling state of the vehicle 100 is drive, 10 gear stages from "1st gear" to "10th gear" can be established in the automatic transmission 30.

When the gear stage of the automatic transmission 30 is changed, the gear ratio of the automatic transmission 30 is set to a gear ratio determined in advance in accordance with each gear stage. Here, the gear ratio of the automatic transmission 30 indicates a ratio indicative of the number of times of rotation of the input shaft 31 during one rotation of the output shaft 32. The gear ratio of the automatic transmission 30 decreases as the gear stage increases.

The upshift switch 66 is a switch to operate a so-called upshift in which the driver increases the gear stage of the automatic transmission 30. Note that, as described above, when the gear stage of the automatic transmission 30 is increased, the gear ratio of the automatic transmission 30 decreases. The downshift switch 67 is a switch to operate a so-called downshift in which the driver decreases the gear stage of the automatic transmission 30. Note that, as described above, when the gear stage of the automatic transmission 30 is decreased, the gear ratio of the automatic transmission 30 increases. In the present embodiment, the downshift switch 67 is one example of a shift actuator. Note that the upshift switch 66 and the downshift switch 67 may be also called a so-called paddle shift.

The vehicle 100 includes an accelerator operation amount sensor 71, a brake operation amount sensor 72, a lever position sensor 73, an input-side rotation speed sensor 76, and an output-side rotation speed sensor 77.

The accelerator operation amount sensor 71 is placed in the vicinity of the accelerator pedal 61. The accelerator operation amount sensor 71 detects an accelerator operation amount ACC as the operation amount of the accelerator pedal 61 to be operated by the driver.

The brake operation amount sensor 72 is placed in the vicinity of the brake pedal 62. The brake operation amount sensor 72 detects a brake operation amount BRA as the operation amount of the brake pedal 62 to be operated by the driver.

The lever position sensor 73 is placed in the vicinity of the shift lever 63. The lever position sensor 73 detects a lever position LP as the operation position of the shift lever 63 to be operated by the driver.

The input-side rotation speed sensor 76 is placed in the vicinity of the input shaft 31. The input-side rotation speed sensor 76 detects an input-side rotation speed NIN as the rotation speed of the input shaft 31. The output-side rotation speed sensor 77 is placed in the vicinity of the output shaft 32. The output-side rotation speed sensor 77 detects an output-side rotation speed NOUT as the rotation speed of the output shaft 32.

The vehicle 100 includes a control device 80. The control device 80 acquires a signal indicative of the accelerator operation amount ACC from the accelerator operation amount sensor 71. The control device 80 acquires a signal indicative of the brake operation amount BRA from the brake operation amount sensor 72. The control device 80 acquires a signal indicative of the lever position LP from the lever position sensor 73. The control device 80 acquires a signal indicative of the input-side rotation speed NIN from the input-side rotation speed sensor 76. The control device 80 acquires a signal indicative of the output-side rotation speed NOUT from the output-side rotation speed sensor 77. The control device 80 acquires a signal indicative of the operation of the upshift switch 66 from the upshift switch 66. The control device 80 acquires a signal indicative of the operation of the downshift switch 67 from the downshift switch 67. Further, the control device 80 calculates a vehicle speed SP as the speed of the vehicle 100 based on the output-side rotation speed NOUT.

The control device 80 includes a driving force calculating portion 81, a motor controlling portion 82, a gear shift controlling portion 83, and a brake controlling portion 84.

The driving force calculating portion 81 calculates a target driving force A as a target value of driving force to drive the vehicle 100. Note that the driving force to drive the vehicle 100 as used herein indicates the torque of the driving wheels 42. The torque of the driving wheels 42 is calculated by a product of the output torque of the motor generator 10, the gear ratio of the automatic transmission 30, and the speed reducing ratio from the output shaft 32 to the driving wheels 42, for example. The driving force calculating portion 81 calculates a target driving force A based on the accelerator operation amount ACC and the vehicle speed SP. In a case where the driving force calculating portion 81 determines that the driver requests acceleration of the vehicle 100, the driving force calculating portion 81 calculates the target driving force A as a positive value. For example, at the same vehicle speed SP, the driving force calculating portion 81 calculates a larger value as the target driving force A as the accelerator operation amount ACC is larger. Further, in a case where the driving force calculating portion 81 determines that the driver requests deceleration of the vehicle 100, the driving force calculating portion 81 calculates the target driving force A as a negative value. For example, at the same vehicle speed SP, the driving force calculating portion 81 calculates a smaller value as the target driving force A as the accelerator operation amount ACC is smaller. Further, for example, at the same accelerator operation amount ACC, the driving force calculating portion 81 calculates a smaller value as the target driving force A as the vehicle speed SP is higher. That is, in a case where the accelerator operation amount ACC is smaller than a given value, the target driving force A becomes a negative value, so that the vehicle 100 decelerates.

The gear shift controlling portion 83 selects a gear stage for the automatic transmission 30 based on the accelerator operation amount ACC and the vehicle speed SP. A gear ratio map indicative of gear stages to be set by the automatic transmission 30 in association with the accelerator operation amount ACC and the vehicle speed SP is stored in the gear shift controlling portion 83 in advance. As illustrated in FIG. 1, in the gear ratio map, at the same accelerator operation amount ACC, a higher gear stage is selected as the vehicle speed SP is higher. Further, at the same vehicle speed SP, a lower gear stage is selected as the accelerator operation amount ACC is larger. The gear shift controlling portion 83 outputs a control signal to the hydraulic mechanism 50 in accordance with the gear stage selected for the automatic transmission 30. Then, the gear shift controlling portion 83 changes gear stages in the automatic transmission 30 by operating the engaged state and the disengaged state of the clutch 33 via the hydraulic mechanism 50. Accordingly, the automatic transmission 30 can automatically change the gear ratio without depending on operations performed by the driver on the upshift switch 66 and the downshift switch 67.

Further, the gear shift controlling portion 83 selects a gear stage for the automatic transmission 30 based on signals indicative of operations of the upshift switch 66 and the downshift switch 67. For example, in a case where the upshift switch 66 is operated by the driver, the gear shift controlling portion 83 selects a one-stage larger gear stage as the gear stage of the automatic transmission 30. Further, in a case where the downshift switch 67 is operated by the driver, for example, the gear shift controlling portion 83 selects a one-stage smaller gear stage as the gear stage of the automatic transmission 30. The gear shift controlling portion 83 outputs a control signal to the hydraulic mechanism 50 in accordance with the gear stage selected for the automatic transmission 30, so that the gear stage of the automatic transmission 30 is changed to the selected gear stage. Accordingly, the automatic transmission 30 also can change the gear ratio in response to operations performed by the driver on the upshift switch 66 and the downshift switch 67. Note that, when a given period of time passes after last input of a signal indicative of an operation on the upshift switch 66 or the downshift switch 67, the gear shift controlling portion 83 selects a gear stage based on the gear ratio map.

The gear shift controlling portion 83 calculates a value obtained by dividing the input-side rotation speed NIN by the output-side rotation speed NOUT. Further, a gear ratio determined per gear stage in the automatic transmission 30 is stored in the gear shift controlling portion 83 in advance. When a difference between the value calculated as above and a gear ratio corresponding to the gear stage to which the automatic transmission 30 is changed is a specific value or less, the gear shift controlling portion 83 determines completion of change of the gear stage of the automatic transmission 30.

The motor controlling portion 82 calculates a target output torque B as a target value of the output torque to rotate the output shaft 11 of the motor generator 10. The motor controlling portion 82 calculates the target output torque B based on the target driving force A and the gear ratio of the automatic transmission 30. Further, the motor controlling portion 82 outputs a control signal to the inverter 21 in accordance with the target output torque B. The motor controlling portion 82 controls the output torque of the motor generator 10 via the inverter 21.

Here, in a case where the target driving force A is a positive value, that is, in a case where acceleration of the vehicle 100 is requested, the motor controlling portion 82 calculates a positive value as the target output torque B. In this case, the motor controlling portion 82 causes the motor generator 10 to function as an electric machine.

Further, in a case where the target driving force A is a negative value, that is, in a case where deceleration of the vehicle 100 is requested, the motor controlling portion 82 calculates a negative value as the target output torque B. In this case, the motor controlling portion 82 causes the motor generator 10 to function as a generator.

Note that the motor controlling portion 82 does not control the output torque of the motor generator 10 based on the brake operation amount BRA. That is, the motor controlling portion 82 controls the output torque of the motor generator 10 regardless of the brake operation amount BRA.

The brake controlling portion 84 controls braking force of the braking devices 55 based on the brake operation amount BRA. More specifically, as the brake operation amount BRA is larger, the brake controlling portion 84 increases the braking force of the braking devices 55.

Note that the control device 80 can be configured as a circuitry including one or more processors configured to execute various processes in accordance with computer programs (software). Note that the control device 80 may be configured as one or more exclusive hardware circuitries such as an application specific integrated circuit (ASIC) configured to execute at least some of the various processes, or a circuitry including a combination of them. The processor includes a CPU and a memory such as a RAM or a ROM. A program code or a command configured to cause the CPU to execute a process is stored in the memory. The memory, i.e., a computer readable medium, includes all available media accessible by a general-purpose or exclusive computer.

Downshift Control

Next will be described a downshift control to be executed by the control device 80. The control device 80 repeatedly executes the following downshift control after the control device 80 starts driving but before the driving is ended.

As illustrated in FIG. 2, when the downshift control is started, the gear shift controlling portion 83 executes a process of step S11. In step S11, the gear shift controlling portion 83 determines whether or not the target output torque B is equal to or less than "0." In step S11, in a case where the gear shift controlling portion 83 determines that the target output torque B is larger than "0" (S11: NO), the gear shift controlling portion 83 ends the current downshift control and executes the process of step S11 again. In this case, the gear shift controlling portion 83 can change the gear stage of the automatic transmission 30 based on the accelerator operation amount ACC, the vehicle speed SP, and the operations on the upshift switch 66 and the downshift switch 67. That is, in a case where the target output torque B is a positive value, the gear shift controlling portion 83 permits the automatic transmission 30 to change the gear stage. In the meantime, in step S11, in a case where the gear shift controlling portion 83 determines that the target output torque B is equal to or less than "0" (S11:YES) the gear shift controlling portion 83 advances the process to step S12.

In step S12, the gear shift controlling portion 83 determines whether or not downshift is requested by the operation on the downshift switch 67. In step S12, in a case where the gear shift controlling portion 83 determines that downshift is not requested by the operation on the downshift switch 67 (S12: NO), the gear shift controlling portion 83 advances the process to step S41. In the meantime, in step S12, in a case where downshift is requested by the operation on the downshift switch 67 (S12: YES), the gear shift controlling portion 83 advances the process to step S13.

In step S13, the gear shift controlling portion 83 determines whether or not the absolute value of the target output torque B is equal to or less than a threshold. Here, the threshold is determined as follows. More specifically, at the time when downshift is executed in the vehicle 100, as the absolute value of the target output torque B just before the downshift is larger, the fluctuation in actual output torque in the motor generator 10 due to the downshift tends to be larger. In view of this, at the time when the vehicle 100 is designed, an allowable value for the fluctuation in the output torque of the motor generator 10 due to downshift of the vehicle 100 is determined by experiment or the like. The allowable value for a fluctuation range of the output torque of the motor generator 10 is set as the threshold. In step S13, in a case where the gear shift controlling portion 83 determines that the absolute value of the target output torque B is larger than the threshold (S13: NO), the gear shift controlling portion 83 advances the process to step S41. In the meantime, in step S13, in a case where the gear shift controlling portion 83 determines that the absolute value of the target output torque B is equal to or less than the threshold (S13: YES), the gear shift controlling portion 83 advances the process to step S21.

In step S21, the gear shift controlling portion 83 determines that a downshift process is permitted. After that, the gear shift controlling portion 83 advances the process to step S31. In step S31, the gear shift controlling portion 83 executes the downshift process of performing downshift in the automatic transmission 30. More specifically, the gear shift controlling portion 83 outputs a control signal to the hydraulic mechanism 50 to start downshifting the gear stage of the automatic transmission 30 via the hydraulic mechanism 50. After that, the gear shift controlling portion 83 advances the process to step S32.

In step S32, the motor controlling portion 82 executes a torque relaxation process of decreasing the absolute value of the output torque of the motor generator 10 in comparison with that before the execution of the downshift process. More specifically, the motor controlling portion 82 sets the target output torque B to "0." Then, the motor controlling portion 82 outputs a control signal to the inverter 21, so that the motor controlling portion 82 controls the output torque of the motor generator 10 via the inverter 21. As a result, the output torque of the motor generator 10 becomes "0." After that, the motor controlling portion 82 advances the process to step S33.

In step S33, the gear shift controlling portion 83 determines whether or not the downshift process is completed. As has been already described, the gear shift controlling portion 83 determines whether or not the downshift process is completed, based on the gear ratio of a gear stage to which the automatic transmission 30 is to be changed by the downshift process, the input-side rotation speed NIN, and the output-side rotation speed NOUT. In step S33, in a case where the gear shift controlling portion 83 determines that the downshift process is not completed (S33: NO), the process of step S33 is repeated. In the meantime, in step S33, in a case where the gear shift controlling portion 83 determines that the downshift process is completed (S33: YES), the gear shift controlling portion 83 advances the process to step S34. Further, in a case where the gear shift controlling portion 83 determines that the downshift process is completed, the motor controlling portion 82 completes the torque relaxation process. That is, the motor controlling portion 82 executes the torque relaxation process after the downshift process is executed but before the downshift process is completed.

In step S34, the motor controlling portion 82 executes a torque recovery process of controlling the output torque of the motor generator 10 such that the output torque of the motor generator 10 has a value having the same sign as the output torque just before the execution of the downshift process and having an absolute value smaller than that of the output torque just before the execution of the downshift process. As a specific example, the target output torque B just before the downshift process is assumed "−10." In this case, as the target output torque B in the torque recovery process, the motor controlling portion 82 takes, for example, "−5" that is a value having an absolute value smaller than the absolute value of "−10." Note that the process of step S34 is executed when an affirmative determination is made in the process of step S33. Accordingly, the motor controlling portion 82 executes the torque recovery process after the downshift process is completed. After that, the motor controlling portion 82 ends the current downshift control and executes the process of step S11 again.

In the meantime, as described above, in a case where the gear shift controlling portion 83 determines, in step S13, that the absolute value of the target output torque B is larger than the threshold (S13: NO), or in a case where the gear shift controlling portion 83 determines that downshift is not requested by the operation on the downshift switch 67 (S12: NO), the gear shift controlling portion 83 advances the process to step S41.

In step S41, the gear shift controlling portion 83 determines that the downshift process is prohibited. That is, in this case, downshift is not performed in the automatic transmission 30. After that, the gear shift controlling portion 83 ends the current downshift control and executes the process of step S11 again.

Operations of Present Embodiment

First, as illustrated in FIG. 3, in time before time t11, the accelerator operation amount ACC is uniform at a certain magnitude. Further, the accelerator operation amount ACC gradually decreases in accordance with the operation by the driver on the accelerator pedal 61 from time t11 to time t15, and the accelerator operation amount ACC is minimum in time t15.

As illustrated in FIG. 3, in time before time t11, the target driving force A has a positive value because the accelerator operation amount ACC has a certain magnitude. Then, from time t11 to time t15, basically, the target driving force A also gradually decreases along with the accelerator operation amount ACC. Further, between time t12 to time t13, and after time t14, the target driving force A has a negative value. That is, during these periods, the vehicle 100 decelerates.

Assume that in time t13 after time t12, the driver operates the downshift switch 67, as illustrated in FIG. 3. Further, assume that, at this time, the absolute value of the target output torque B of the motor generator 10 is equal to or less than the threshold. As a result, as illustrated in FIG. 3, in time t13 to time t14, the downshift process is executed in the automatic transmission 30. At this time, as illustrated in FIG. 3, in time t13 to time t14, the output torque of the motor generator 10 becomes "0" due to the torque relaxation process. That is, a load of the motor generator 10 connected to the input shaft 31 of the automatic transmission 30 is minimized.

As illustrated in FIG. 3, the downshift process is completed in time t14. Hereby, as illustrated in FIG. 3, due to the torque recovery process, the output torque of the motor generator 10 becomes a value having the same sign as the output torque just before the execution of the downshift process and having an absolute value smaller than that of the output torque just before the execution of the downshift process.

Effects of Embodiment (1) In the present embodiment, in a case where the target output torque B of the motor generator 10 is zero or a negative value, that is, in a case where the motor generator 10 does not give a positive acceleration to the vehicle 100, the gear ratio of the automatic transmission 30 is not downshifted unless the driver requests downshift by use of the downshift switch 67. Accordingly, in this case, a gear shift shock along with downshift does not occur in the automatic transmission 30.

In the meantime, even in a case where the target output torque B of the motor generator 10 is zero or a negative value, when the driver requests downshift by use of the downshift switch 67, the gear ratio of the automatic transmission 30 is downshifted. Accordingly, in this case, a gear shift shock along with the downshift occurs in the automatic transmission 30. However, the gear shift shock occurs in response to the downshift requested by the driver, so that the driver is unlikely to have an uncomfortable feeling as an unexpected gear shift shock.

(2) In the vehicle 100, during execution of the downshift process, the transfer efficiency of torque via the automatic transmission 30 changes. On this account, when the absolute value of the output torque of the motor generator 10 is large during the execution of the downshift process, the fluctuation range of force to be transmitted from the motor generator 10 to the driving wheels 42 easily increases due to changes in the transfer efficiency of torque via the automatic transmission 30.

In this respect, in the present embodiment, due to the torque relaxation process, the absolute value of the output torque of the motor generator 10 during the execution of the downshift process decreases. Since the absolute value of the output torque of the motor generator 10 is small as such, even when the transfer efficiency of torque via the automatic transmission 30 changes, it is possible to restrain the fluctuation range of the force to be transmitted from the motor generator 10 to the driving wheels 42 from excessively increasing, just by that much.

(3) In the present embodiment, the absolute value of the output torque of the motor generator 10 in the torque relaxation process becomes "0." On this account, even when the transfer efficiency of torque via the automatic transmission 30 changes in the course of the downshift process, the fluctuation range of the force to be transmitted from the motor generator 10 to the driving wheels 42 via the automatic transmission 30 is uniform at "0." That is, in the course of the downshift process, no gear shift shock occurs due to changes in the force to be transmitted from the motor generator 10 to the driving wheels 42.

(4) In the present embodiment, under the condition that the absolute value of the target output torque B of the motor generator 10 is equal to or less than the threshold, the downshift process and the torque relaxation process along with the downshift process are executed. Accordingly, even in a case where the absolute value of the output torque of the motor generator 10 becomes "0" by the torque relaxation process, the fluctuation range of the output torque of the motor generator 10 due to start of the downshift process does not exceed the threshold. Accordingly, the acceleration of the vehicle 100 does not excessively change or the vehicle 100 does not excessively vibrate due to the fluctuation range of the output torque of the motor generator 10 being excessively large.

(5) In the vehicle 100, the gear ratio of the automatic transmission 30 increases due to the downshift process. On this account, as illustrated in FIG. 3, the rotation speed of the output shaft 11 in time t14 that is a completion timing of the downshift process is larger than the rotation speed of the output shaft 11 in time t13 that is a start timing of the downshift process.

Here, if the output torque of the motor generator 10 is the same before and after the execution of the downshift process, the driving force of the vehicle 100 is larger at the time of completion of the downshift process because the rotation speed of the output shaft 11 is large. That is, a gear shift shock occurs at the time of completion of the downshift process.

In this respect, in the present embodiment, due to the torque recovery process, the output torque of the motor generator 10 in time t14 that is the completion timing of the downshift process has a value having the same sign as the output torque in time t13 as the start timing of the downshift process and having an absolute value smaller than that of the output torque in time t13. Hereby, as illustrated in FIG. 3, even if the rotation speed of the output shaft 11 of the motor generator 10 becomes higher in time t14 than in time t13, the fluctuation range of the driving force of the vehicle 100 is small. That is, even when the rotation speed of the output shaft 11 of the motor generator 10 increases, it is possible to restrain a gear shift shock from occurring in time t14 as the completion timing of the downshift process.

(6) In terms of the electric vehicle, there has been known a technology to control a whole braking force as the sum of a braking force of the braking devices 55 and a regenerative brake force of the motor generator 10 such that the whole braking force reaches a braking force corresponding to the brake operation amount BRA. In such a technology, on the premise that the motor generator 10 provides uniform performance, the distribution between the braking force of the braking devices 55 and the regenerative brake force of the motor generator 10 is determined in advance. However, each time an internal combustion engine is replaced with the motor generator 10 or the motor generator 10 is replaced with a new one, the motor generator 10 thus provided in the vehicle 100 provides different performance. Accordingly, in a case where the distribution of brake force is determined in advance, the vehicle 100 provides a different braking behavior each time.

In the meantime, in the present embodiment, the motor controlling portion 82 controls the output torque of the motor generator 10 regardless of the brake operation amount BRA. Accordingly, the brake operation amount BRA does not affect regenerative torque of the motor generator 10, that is, a negative acceleration to be given to the vehicle 100 by the motor generator 10. Accordingly, such a situation does not occur that, even though the brake operation amount BRA is uniform, a negative acceleration caused in the vehicle 100 varies due to variations in performance of the motor generator 10 to be attached to the vehicle 100.

Modifications

The present embodiment can also be carried out by adding changes as stated below. The present embodiment and the following modifications can be carried out in combination as long as they do not cause any technical inconsistencies.

In the above embodiment, execution conditions to execute the downshift process may be changed. For example, in a case where a downshift operation is performed, the downshift process may be performed regardless of how large or small the target output torque B is. That is, the process of S13 may be omitted.

In the above embodiment, the torque recovery process may be omitted. For example, in a case where the change amount of the gear ratio of the automatic transmission 30 along with the downshift process is small, the rotation speed of the motor generator 10 along with the downshift process can hardly increase. In this case, there is no problem even if the process of S34 is omitted in the downshift control.

In the above embodiment, the output torque of the motor generator 10 can be changed in the torque relaxation process. For example, the output torque of the motor generator 10 to be changed by the torque relaxation process may not necessarily be changed to "0" and may be changed to a negative value smaller than "0" or a positive value larger than "0." Even in this case, the absolute value of the output torque of the motor generator 10 to be changed by the torque relaxation process should be smaller than that just before the execution of the downshift process.

In the above embodiment, the torque relaxation process may be omitted. For example, in a case where the torque relaxation process is omitted, a gear shift shock easily occurs due to changes in the transfer efficiency of torque via the automatic transmission 30. Note that, as described above, the downshift process is executed in a case where the driver requests downshift by use of the downshift switch 67. On this account, even when a gear shift shock occurs due to omission of the torque relaxation process, the driver is unlikely to have an uncomfortable feeling as an unexpected gear shift shock.

In the above embodiment, in a case where a negative determination is made in the process of S13, the driver may be notified that downshift cannot be performed. For example, in a case where a negative determination is made in the process of S13, the downshift process is prohibited even though downshift is requested by the operation on the downshift switch 67. Accordingly, the driver may have an uncomfortable feeling about the gear stage of the automatic transmission 30 being not changed. In view of this, in a case where a negative determination is made in the process of S13, the driver may be notified that the downshift process is prohibited. As a concrete example of the notification to the driver, the driver may be notified that the downshift process is prohibited, through lighting of an indicator lamp. Further, in a case where the gear stage of the automatic transmission 30 is always displayed on a display or the like, when the display of the gear stage does not change, the driver can also grasp that downshift cannot be performed.

In the above embodiment, the motor controlling portion 82 may control the output torque of the motor generator 10 in accordance with the brake operation amount BRA. That is, the motor controlling portion 82 may control the output torque of the motor generator 10 based on the brake operation amount BRA.

In the above embodiment, the shift actuator is not limited to the downshift switch 67. For example, the shift lever 63 may be caused to function as the shift actuator such that the gear stage of the automatic transmission 30 is operable by the shift lever 63. In this case, the upshift switch 66 or the downshift switch 67 may be omitted.

What is claimed is:

1. A control device for controlling a vehicle including a motor generator as a drive source for the vehicle, an automatic transmission via which the motor generator is connected to driving wheels, the automatic transmission being configured to change a gear ratio, and a shift actuator for a driver to operate the gear ratio of the automatic transmission, the control device comprising:
a motor controlling portion configured to control output torque of the motor generator; and
a gear shift controlling portion configured to control the gear ratio of the automatic transmission, wherein
in a case where the output torque is zero or a negative value, when downshift is not requested by an operation on the shift actuator, the gear shift controlling portion prohibits a downshift process of downshifting the gear ratio of the automatic transmission, but when downshift is requested by an operation on the shift actuator, the gear shift controlling portion permits execution of the downshift process;
the vehicle includes mechanical braking devices configured to brake the driving wheels, and a brake pedal for the driver to operate the braking devices;
the control device includes a brake controlling portion configured to control braking force of the braking devices based on an operation amount of the brake pedal; and
the motor controlling portion controls the output torque regardless of the operation amount of the brake pedal.

2. The control device according to claim 1, wherein, until the downshift process is completed after the downshift process is executed, the motor controlling portion executes a torque relaxation process of decreasing an absolute value of the output torque in comparison with an absolute value of the output torque before the execution of the downshift process.

3. The control device according to claim 2, wherein, under a condition that the absolute value of the output torque is equal to or less than a predetermined threshold, the motor controlling portion permits the execution of the downshift process and controls the output torque in the torque relaxation process such that the output torque is zero.

4. The control device according to claim 2, wherein, after the downshift process is completed, the motor controlling portion executes a torque recovery process of controlling the output torque such that the output torque has a value having the same sign as the output torque just before the execution of the downshift process and having an absolute value smaller than an absolute value of the output torque just before the execution of the downshift process.

* * * * *